United States Patent
Dragon et al.

(10) Patent No.: US 10,533,529 B2
(45) Date of Patent: Jan. 14, 2020

(54) STARTER CONTROLLER FOR STARTER MOTOR

(71) Applicant: BorgWarner Inc., Auburn Hills, MI (US)

(72) Inventors: Andrew Dragon, Fishers, IN (US); David Fulton, Anderson, IN (US)

(73) Assignee: BORGWARNER INC., Auburn Hills, MI (US)

(*) Notice: Subject to any disclaimer, the term of this patent is extended or adjusted under 35 U.S.C. 154(b) by 0 days.

(21) Appl. No.: 16/006,328

(22) Filed: Jun. 12, 2018

(65) Prior Publication Data
US 2018/0372052 A1   Dec. 27, 2018

Related U.S. Application Data

(60) Provisional application No. 62/523,418, filed on Jun. 22, 2017.

(51) Int. Cl.
*F02N 11/00* (2006.01)
*H02P 9/04* (2006.01)
*F02N 11/08* (2006.01)

(52) U.S. Cl.
CPC .... *F02N 11/087* (2013.01); *F02N 2011/0874* (2013.01); *F02N 2200/023* (2013.01);
(Continued)

(58) Field of Classification Search
CPC ..................................................... F02N 11/087
See application file for complete search history.

(56) References Cited

U.S. PATENT DOCUMENTS

| | | | | |
|---|---|---|---|---|
| 3,362,388 A | * | 1/1968 | Evert | ........................ F02P 11/02 123/146.5 C |
| 4,412,137 A | | 10/1983 | Hansen et al. | |
| 4,862,010 A | | 8/1989 | Yamaoto | |
| 4,896,637 A | | 1/1990 | Yamamoto | |

(Continued)

FOREIGN PATENT DOCUMENTS

| EP | 1041275 A1 | 4/2000 |
|---|---|---|
| JP | 2012202309 A | 10/2012 |

OTHER PUBLICATIONS

Notification of Transmittal of the International Search Report and the Written Opinion of the International Searching Authority, or the Declaration; PCT/US2018/037985; dated Sep. 28, 2018; 10 pages.

*Primary Examiner* — Tulsidas C Patel
*Assistant Examiner* — Thomas K Quigley
(74) *Attorney, Agent, or Firm* — Cantor Colburn LLP

(57) ABSTRACT

A starter motor controller for a starter motor operatively connected to a single coil solenoid includes a first pair of switches including a first solenoid switch and a second solenoid switch. The first solenoid switch selectively completes a first electrical circuit for delivering a first electrical current to the single coil solenoid and the second solenoid switch selectively completes a second electrical circuit for delivering a second electrical current to the single coil solenoid that is less than the first electrical current. A second pair of switches includes a first starter motor switch and a second starter motor switch. The first starter motor switch selectively completes a first electrical circuit for delivering a first electrical power to the starter motor and the second starter motor switch selectively completes a second electrical circuit for delivering a second electrical power to the starter motor that is greater than the first electrical power.

15 Claims, 7 Drawing Sheets

(52) U.S. Cl.
CPC .............................. *F02N 2300/106* (2013.01);
*F02N 2300/2002* (2013.01); *F02N 2300/2011*
(2013.01)

(56) References Cited

U.S. PATENT DOCUMENTS

| | | | | |
|---|---|---|---|---|
| 4,930,466 | A * | 6/1990 | Osborne, Jr. | ............ F02P 11/02 |
| | | | | 123/179.5 |
| 5,622,148 | A | 4/1997 | Xue et al. | |
| 5,970,937 | A | 10/1999 | Casellato et al. | |
| 6,104,157 | A * | 8/2000 | Kramer | ............... F02N 11/0851 |
| | | | | 318/430 |
| 6,148,781 | A | 11/2000 | Boegner et al. | |
| 6,456,034 | B1 | 9/2002 | Vilou | |
| 7,275,509 | B2 | 10/2007 | Kassner | |
| 7,665,438 | B2 | 2/2010 | Hirning et al. | |
| 8,513,825 | B2 * | 8/2013 | Suzuki | .................. F02N 11/087 |
| | | | | 290/38 R |
| 8,754,556 | B2 * | 6/2014 | Haruno | ................. F02N 11/087 |
| | | | | 310/71 |
| 2002/0014216 | A1 | 2/2002 | Boegner et al. | |
| 2003/0230271 | A1 | 12/2003 | Maruhashi et al. | |
| 2005/0099009 | A1 * | 5/2005 | Spellman | ............ F02N 11/0851 |
| | | | | 290/38 R |
| 2010/0083926 | A1 | 4/2010 | Okumoto et al. | |
| 2010/0186703 | A1 | 7/2010 | Heusel et al. | |
| 2010/0244459 | A1 | 9/2010 | Gibson et al. | |
| 2010/0299053 | A1 | 11/2010 | Okumoto et al. | |
| 2011/0132308 | A1 | 6/2011 | Liu et al. | |
| 2011/0187127 | A1 | 8/2011 | Murata et al. | |
| 2011/0213525 | A1 | 9/2011 | Kanemoto et al. | |
| 2012/0186551 | A1 * | 7/2012 | Rentschler | .......... F02N 11/0855 |
| | | | | 123/179.3 |
| 2014/0102395 | A1 * | 4/2014 | Fujita | .................. F02N 11/0844 |
| | | | | 123/179.4 |
| 2015/0219059 | A1 * | 8/2015 | Fujita | .................. F02N 11/0855 |
| | | | | 290/38 R |
| 2015/0285203 | A1 * | 10/2015 | Hirabayashi | ........ F02N 11/0848 |
| | | | | 123/179.25 |
| 2015/0308397 | A1 * | 10/2015 | Hirabayashi | ............... H02P 7/06 |
| | | | | 290/38 C |

* cited by examiner

STARTER CONTROLLER FOR STARTER MOTOR

CROSS REFERENCE TO RELATED APPLICATIONS

This application claims the benefit of an earlier filing date from U.S. Provisional Application Ser. No. 62/523,418 filed Jun. 22, 2017, the entire disclosure of which is incorporated herein by reference.

BACKGROUND OF THE INVENTION

Exemplary embodiments pertain to the art of motor vehicle starter motors and, more particularly, to a starter controller for a starter motor.

Starter motors are typically employed to initiate operation of an internal combustion engine. The starter motor includes an armature operatively connected to a pinion that is selectively extended into meshing engagement with a ring gear of the internal combustion engine. The armature is activated causing the pinion to rotate. Rotation of the pinion is transferred to the ring gear which, when other factors are present, causes the internal combustion engine to begin operation. Also typically, a solenoid is utilized to activate the starter motor.

The solenoid is operatively connected to a switch, such as a key switch, push button, or the like, that may be engaged when it is desired for the internal combustion engine to start. The solenoid includes a first or pull-in coil and a second or hold-in coil. Energizing both coils causes a plunger to move inwardly driving the pinion towards the ring gear and closes a set of contacts to enable motor operation. The pull-in coil is shorted when the set of contacts close and the hold-in coil holds the plunger in with a lower current while the pinion rotates. When the internal combustion engine starts, the pinion is drawn back in and the armature coasts to a stop. Currents associated with operating the solenoid are parasitic to motor operation and therefore should be reduced. During motor operation, a number of revolutions are accumulated for each engine starting event. Reducing the number of revolutions directly improves operational life of the motor.

BRIEF DESCRIPTION OF THE INVENTION

Disclosed is a starter motor controller for a starter motor operatively connected to a single coil solenoid. The starter motor controller includes a first pair of switches including a first solenoid switch and a second solenoid switch. The first solenoid switch selectively completes a first electrical circuit for delivering a first electrical current to the single coil solenoid and the second solenoid switch selectively completes a second electrical circuit for delivering a second electrical current to the single coil solenoid that is less than the first electrical current. A second pair of switches includes a first starter motor switch and a second starter motor switch. The first starter motor switch selectively completes a first electrical circuit for delivering a first electrical power to the starter motor and the second starter motor switch selectively completes a second electrical circuit for delivering a second electrical power to the starter motor that is greater than the first electrical power.

Also disclosed is a method of controlling a starter motor operatively connected to a single coil solenoid including closing a first solenoid switch and a second solenoid switch of a first pair of switches to activate a solenoid and draw in a solenoid plunger with a first electrical current engaging a pinion with a ring gear of an internal combustion engine, opening one of the first and second solenoid switches of the first switch pair to hold in the solenoid plunger with a second electrical current that is less than the first electrical current, and closing at least one of a first starter motor switch and a second starter motor switch of a second switch pair to activate the starter motor at one of a first power and a second power that is greater than the first power.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
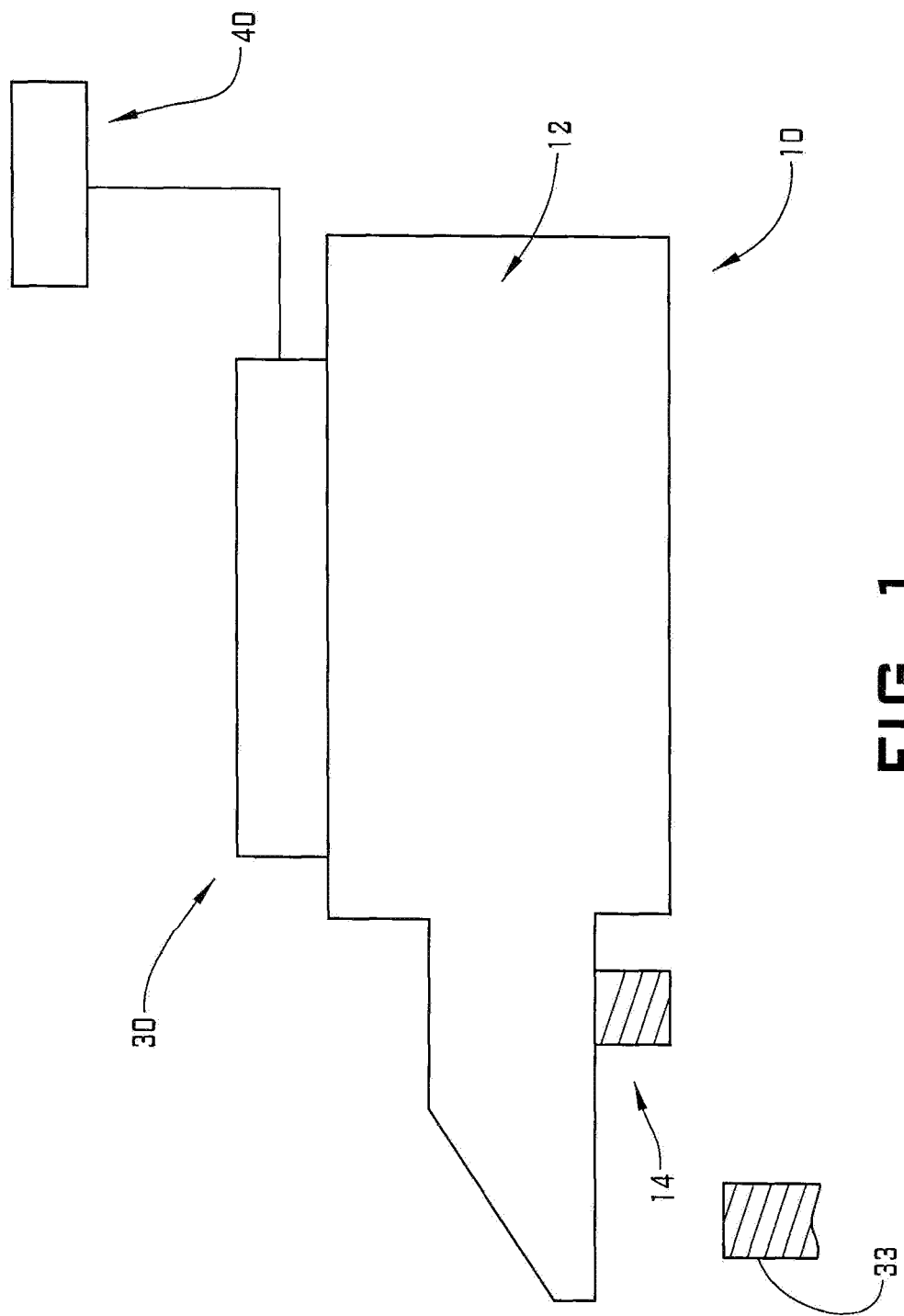
FIG. 1 depicts a starter motor and single coil solenoid including a starter motor controller, in accordance with an exemplary embodiment.
Figure 2:
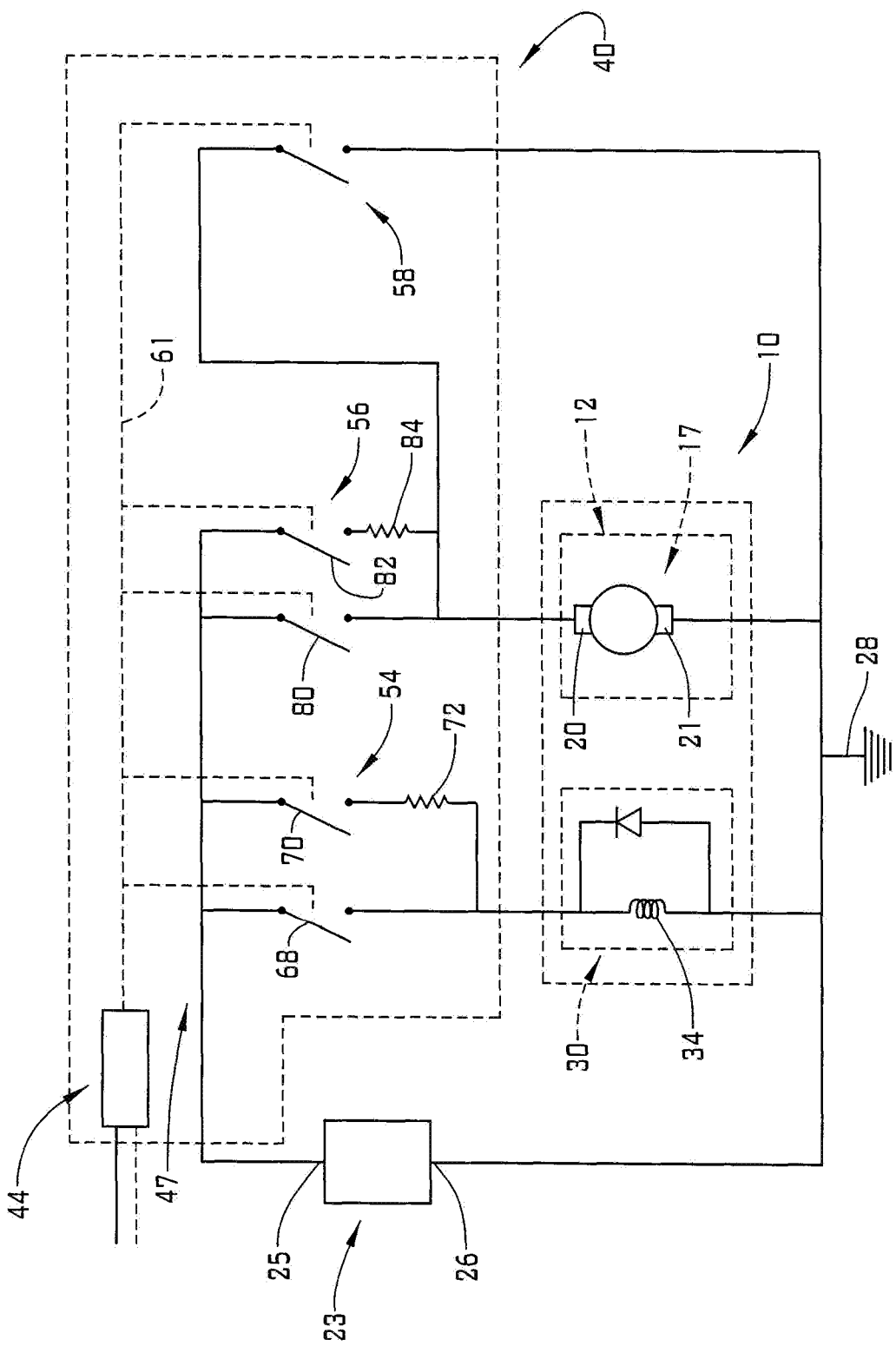
FIG. 2 depicts a schematic diagram of the starter motor controller, in accordance with an aspect of an exemplary embodiment.

A starter motor, in accordance with an exemplary embodiment, is indicated generally at 10 in FIG. 1. Starter motor 10 includes a starter motor housing 12 that supports a pinion gear 14 and a starter motor armature 17 as shown in FIG. 2. Starter motor armature 17 includes a first terminal 20 and a second terminal 21 connected to a battery 23. More specifically, first terminal 20 may be electrically connected to a positive terminal 25 of battery 23 and second terminal 21 may be electrically connected to a negative terminal 26 of battery 23 and a ground 28. First terminal 20 may take the form of a first brush (not separately labeled) and second terminal 21 may take the form of a second brush (also not separately labeled). Starter motor housing 12 may also support a solenoid 30 having a plunger (not shown) that selectively shifts pinion gear 14 into contact with a ring gear 33 of an internal combustion engine (also not shown). Solenoid 30, in accordance with an exemplary embodiment, includes a single coil solenoid 34. Therefore, solenoid 30 takes the form of a single coil solenoid 34.

In accordance with an exemplary aspect, starter motor 10 is operatively connected to a starter motor controller 40 including a microcontroller 44 and a plurality of switches 47 as shown in FIG. 2. Plurality of switches 47 includes a first switch pair 54, a second switch pair 56, and a back electromotive force (EMF) discharge switch 58 operatively connected to microcontroller 44 through a control circuit 61. Plurality of switches 47 may take the form of metal oxide semiconductor field effect transistor (MOSFET) switches, magnetic switches, or other controllable members that may selectively interrupt and connect an electrical circuit. It should be understood that plurality of switches 47 may also take the form of a combination of the above.

Figure 3:
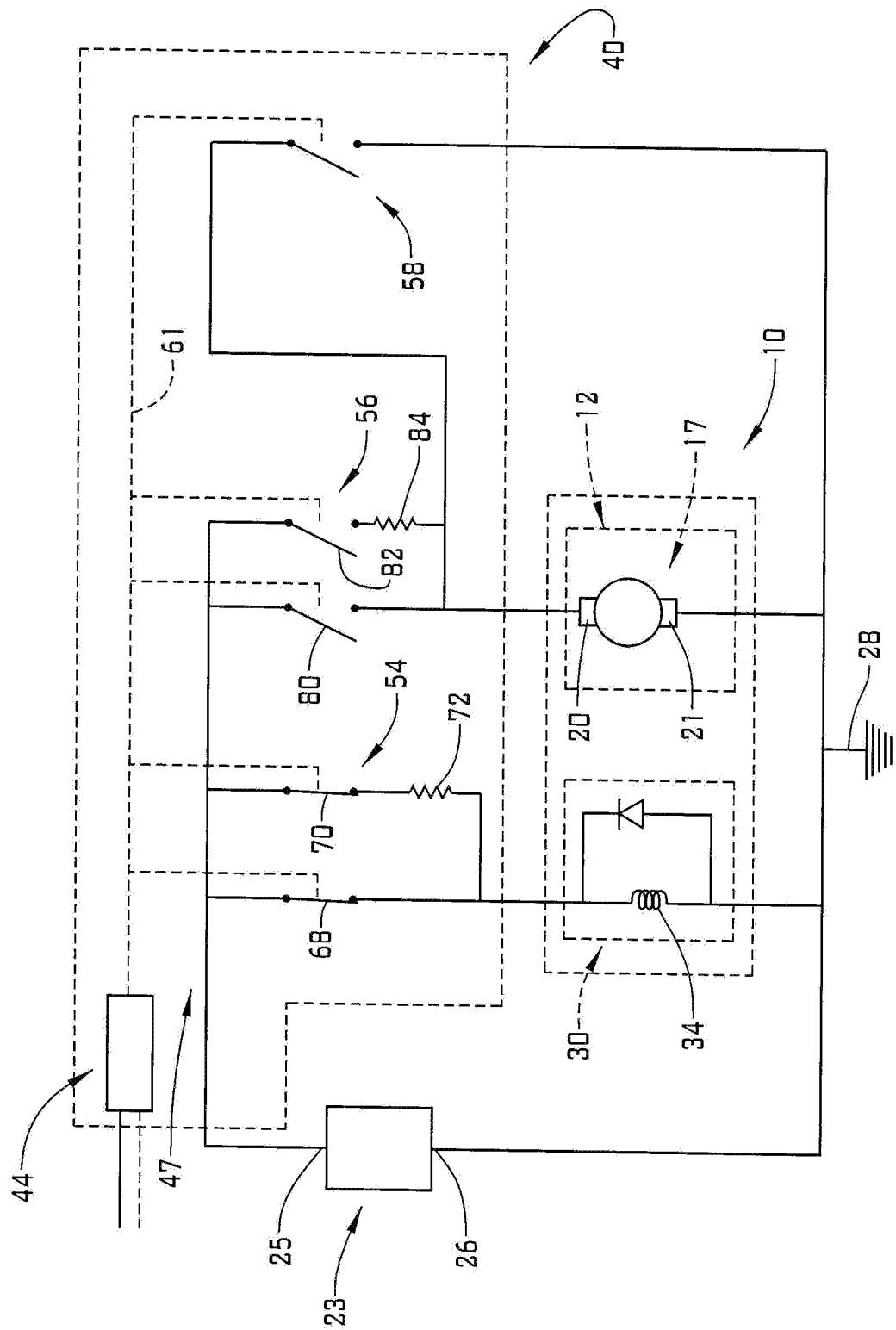
FIG. 3 depicts a schematic diagram of the starter motor controller showing solenoid plunger activation, in accordance with an aspect of an exemplary embodiment.
Figure 4:
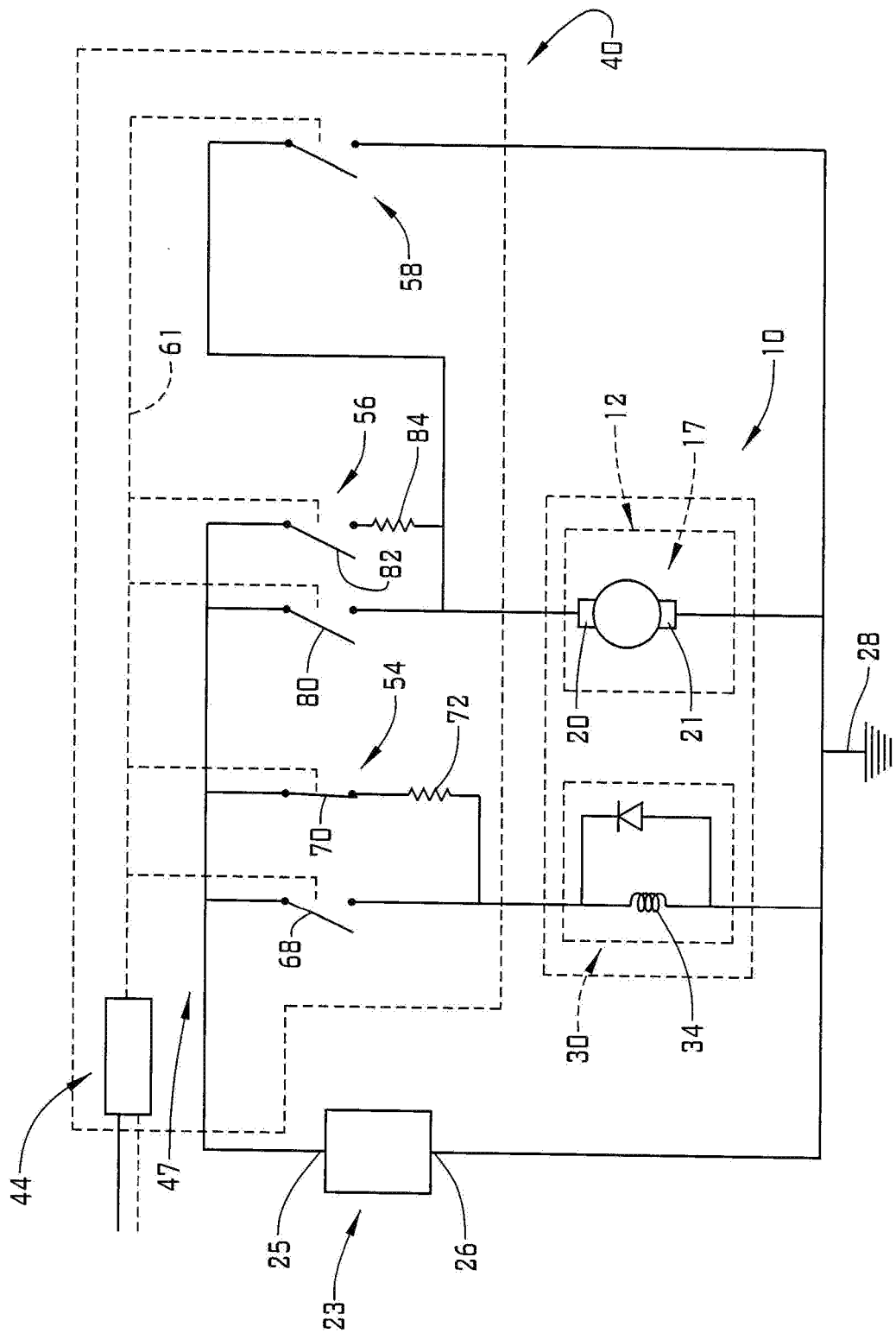
FIG. 4 depicts a schematic diagram of the starter motor controller showing solenoid plunger hold in, in accordance with an aspect of an exemplary embodiment.

In accordance with an exemplary aspect, when an engine initiation signal is received by starter motor controller 40, microcontroller 44 closes first solenoid switch 68 and second solenoid switch 70 as shown in FIG. 3 causing single coil solenoid 34 to be energized and the solenoid plunger (not shown) to be drawn inwardly and pinion gear 14 shifted into engagement with ring gear 33. After a first period of time from initial activation, about 25 milliseconds (ms), first solenoid switch 68 is opened as shown in FIG. 4 causing activation current to flow through first resistor 72. It is to be understood that the first period of time may vary. Activation current may drop from about 40 amps (A) when first and second solenoid switches (68 and 70) are closed to about 10 A with first solenoid switch 68 open.

Figure 5:
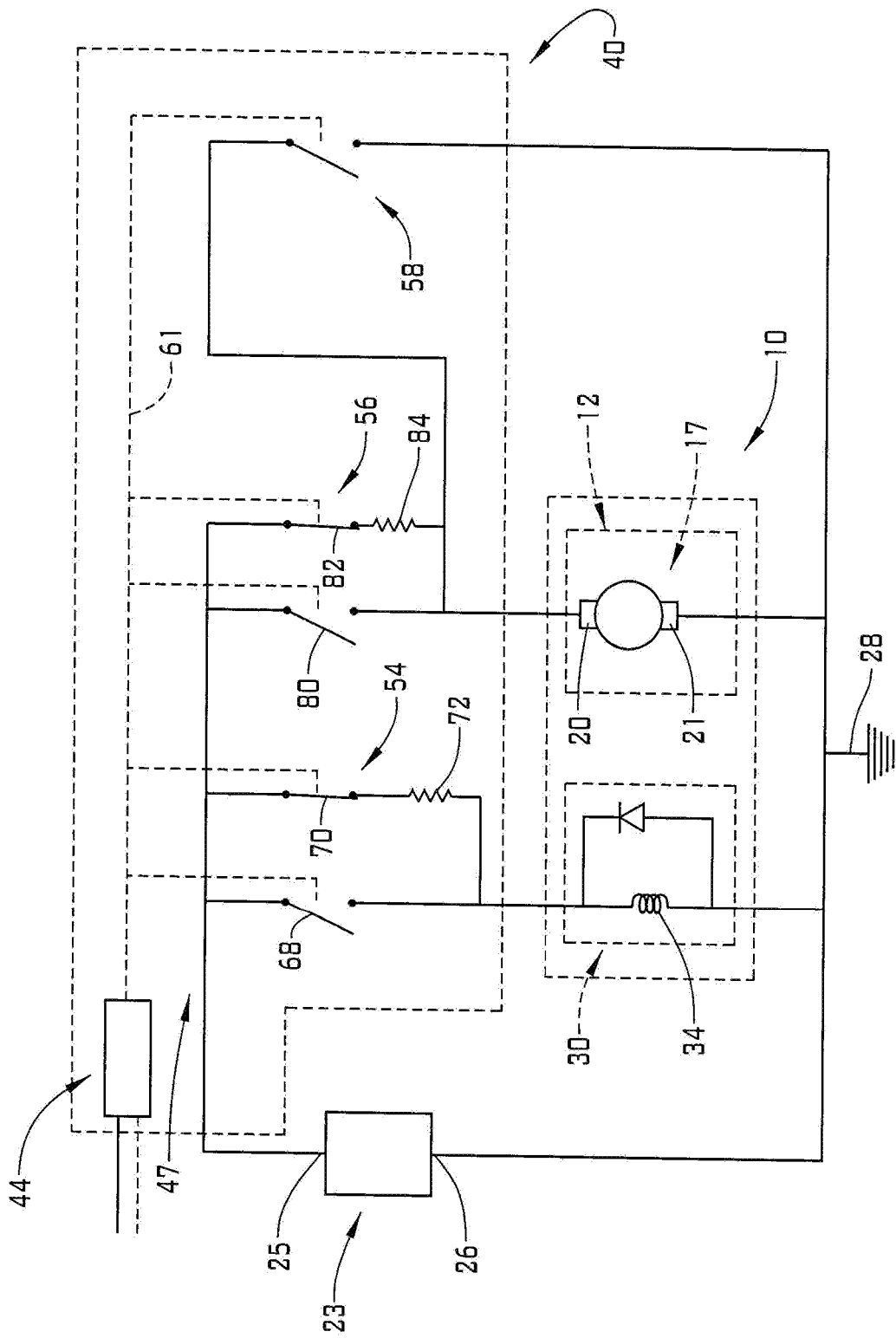
FIG. 5 depicts a schematic diagram of the starter motor controller showing starter motor activation at a first power, in accordance with an aspect of an exemplary embodiment.
Figure 6:
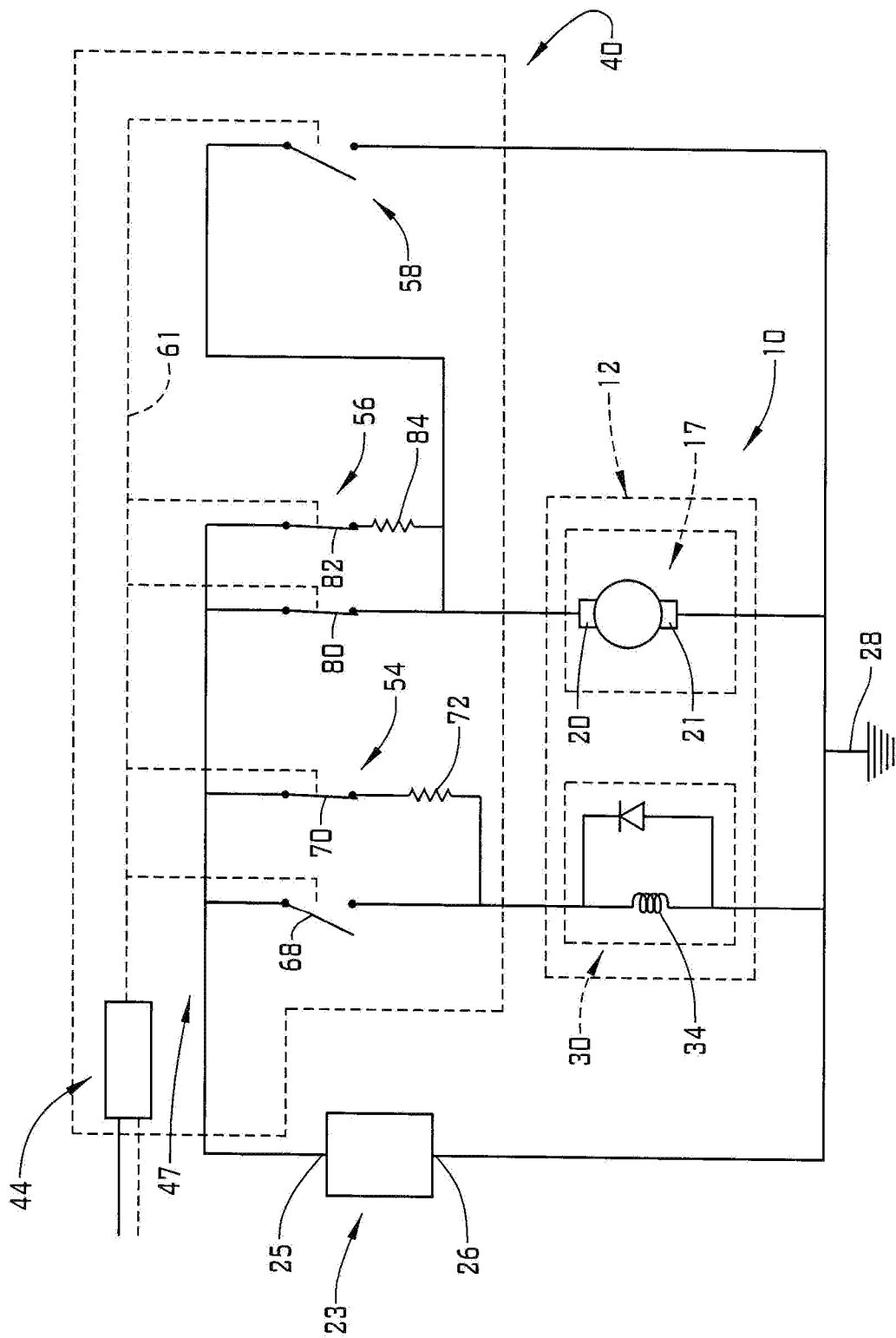
FIG. 6 depicts a schematic diagram of the starter motor controller showing starter motor activation at a second, higher power, in accordance with an aspect of an exemplary embodiment.
Figure 7:
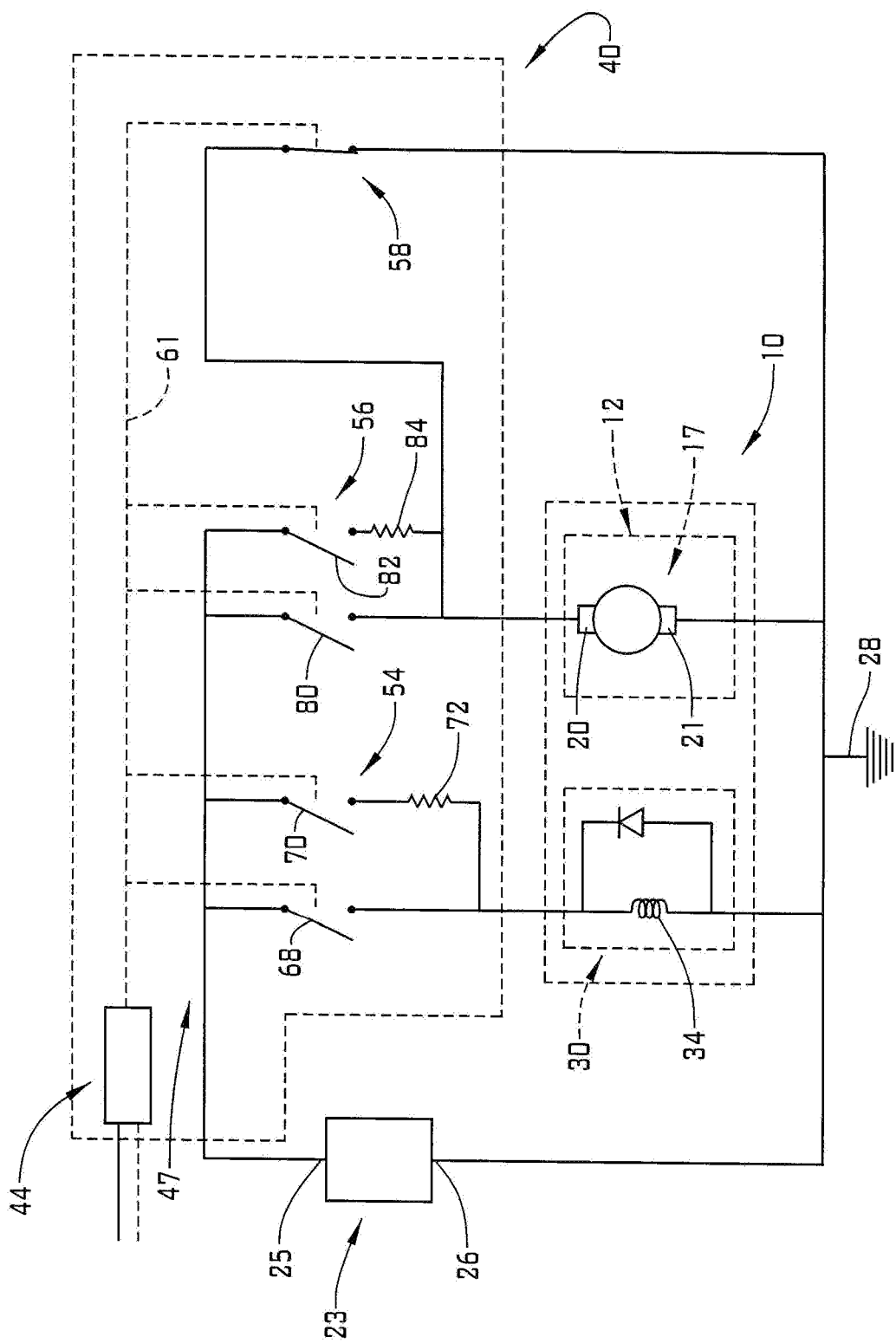
FIG. 7 depicts a schematic diagram of the starter motor controller showing a back EMF discharge circuit completion, in accordance with an aspect of an exemplary embodiment.

At about the same time first solenoid switch 68 is opened, second starter motor switch 82 is closed causing motor activation current to pass through second resistor 84 as shown in FIG. 5. In this configuration, starter motor 10 may be operating at a first electrical power. In accordance with an exemplary aspect, the first power may be half power with motor activation current being about 400 amps to about 600 amps. After a second period of time from initial activation, first starter motor switch 80 may be closed causing starter motor 10 to operate at a second electrical power that is greater than the first power. Of course, it should be understood that starter motor 10 may simply be activated at the first power in order to start a warm internal combustion engine. Additionally, starter motor 10 may be activated at the second power only in order to start a cold internal combustion engine. In accordance with an exemplary aspect, motor activation current may be about 40 A. In further accordance with an exemplary aspect, the second period of time may be between about 75 ms and about 175 ms. Of course, it is to be understood that the period of time may vary.

Once the internal combustion engine has started, first switch pair 54 and second switch pair 56 are opened disconnecting solenoid 30 and starter motor armature 17 from battery 23 as shown in FIG. 2. At this point, the solenoid plunger begins to retract and starter motor armature 17 coasts toward a stop. Typically, the internal combustion engine is started after a third period of time from initial activation, between about 500 ms and about 1000 ms, from initial activation.

After first switch pair 54 and second switch pair 56 are opened back EMF discharge switch 58 is closed causing current in starter motor armature 17 to flow to ground. Current flows due to voltage generated by motor armature 17 which is still rotating when switch 58 is closed. Peak current flowing through back EMF discharge switch 58 may be as high as about 1000 A or more. By forming a circuit with ground, a generating torque is applied to motor armature 17 reducing coast down revolutions and subsequently reducing wear on starter motor armature 17 and the first and second brushes. After a fourth period of time from initial activation, between about 700 ms and about 1400 ms, starter motor 10 coast down is finished and back EMF discharge switch 58 is opened.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A starter motor controller for a starter motor operatively connected to a single coil solenoid, the starter motor controller comprising:
   a first pair of switches including a first solenoid switch and a second solenoid switch, the first solenoid switch selectively completing a first electrical circuit for delivering a first electrical current to the single coil solenoid and the second solenoid switch selectively completing a second electrical circuit for delivering a second electrical current to the single coil solenoid that is less than the first electrical current; and
   a second pair of switches including a first starter motor switch and a second starter motor switch, the first starter motor switch selectively completing a first electrical circuit for delivering a first electrical power to the starter motor and the second starter motor switch selectively completing a second electrical circuit for delivering a second electrical power to the starter motor that is greater than the first electrical power.

2. The starter motor controller according to claim 1, further comprising: a back EMF discharge switch selectively electrically connecting the starter motor to ground.

3. The starter motor controller according to claim 1, further comprising: a microcontroller, each of the first pair of switches and the second pair of switches being operatively coupled to the microcontroller.

4. The starter motor controller according to claim 3, wherein at least one of the first pair of switches and at least one of the second pair of switches comprises a metal oxide semiconductor field effect transistor (MOSFET) switch.

5. The starter motor controller according to claim 3, wherein each of the first pair of switches and the second pair of switches comprises MOSFET switch.

6. The starter motor controller according to claim 3, wherein at least one of the first pair of switches and at least one of the second pair of switches comprises a magnetic switch.

7. The starter motor controller according to claim 3, wherein each of the first pair of switches and the second pair of switches comprises a magnetic switch.

8. A method of controlling a starter motor operatively connected to a single coil solenoid comprising:
- closing a first solenoid switch and a second solenoid switch of a first pair of switches to activate a solenoid and draw in a solenoid plunger with a first electrical current engaging a pinion with a ring gear of an internal combustion engine;
- opening one of the first and second solenoid switches of the first switch pair to hold in the solenoid plunger with a second electrical current that is less than the first electrical current; and
- closing at least one of a first starter motor switch and a second starter motor switch of a second switch pair to activate the starter motor at one of a first power and a second power that is greater than the first power.

9. The method of claim 8, wherein the one of the first and second solenoid switches is opened about 25 milliseconds after the first and second solenoid switches are closed.

10. The method of claim 8, wherein closing the at least one of the first starter motor switch and the second starter motor switch includes closing the first starter motor switch to activate the starter motor at half power.

11. The method of claim 10, further comprising: closing both of the first starter motor switch and the second starter motor switch to activate the starter motor at full power.

12. The method claim 8, further comprising: initially closing the first starter motor switch to activate the starter motor at the first power and closing the second starter motor switch to activate the starter motor at the second power.

13. The method of claim 12, wherein closing the second starter motor switch includes closing the second starter motor switch between about 75 and about 175 milliseconds after closing the first starter motor switch.

14. The method of claim 8, further comprising: operating the first switch pair and the second switch pair to interrupt a flow of electrical energy to each of the solenoid and the starter motor.

15. The method of claim 14, further comprising: closing a back EMF electrically connecting the each of a first starter motor terminal and a second starter motor terminal to ground.

* * * * *